(12) United States Patent
Albert

(10) Patent No.: US 7,775,255 B2
(45) Date of Patent: Aug. 17, 2010

(54) SHADING DEVICE FOR MOTOR VEHICLES

(75) Inventor: Jean-Paul Albert, Aix-en-Provence (FR)

(73) Assignee: Webasto AG, Stockdorf (DE)

( * ) Notice: Subject to any disclaimer, the term of this patent is extended or adjusted under 35 U.S.C. 154(b) by 235 days.

(21) Appl. No.: 11/721,004

(22) PCT Filed: Nov. 29, 2005

(86) PCT No.: PCT/DE2005/002151

§ 371 (c)(1),
(2), (4) Date: Jan. 31, 2008

(87) PCT Pub. No.: WO2006/060990

PCT Pub. Date: Jun. 15, 2006

(65) Prior Publication Data

US 2009/0033113 A1    Feb. 5, 2009

(30) Foreign Application Priority Data

Dec. 6, 2004    (FR) .................... 04 12937

(51) Int. Cl.
*E06B 9/40* (2006.01)

(52) U.S. Cl. .................. 160/290.1; 160/275

(58) Field of Classification Search ........... 160/370.22, 160/290.1, 275, 276, 289, 268.1, 264, 201, 160/273.1, 133

See application file for complete search history.

(56) References Cited

U.S. PATENT DOCUMENTS

| | | | | |
|---|---|---|---|---|
| 693,664 A * | 2/1902 | Milans | ............. | 160/289 |
| 729,630 A * | 6/1903 | Milans | ............. | 160/289 |
| 804,308 A * | 11/1905 | Forsyth | ............. | 160/282 |
| 1,246,570 A * | 11/1917 | Edwards | ............. | 160/31 |
| 1,749,199 A * | 3/1930 | Traut | ............. | 160/267.1 |
| 1,871,141 A * | 8/1932 | Baker et al. | ............. | 160/267.1 |
| 1,880,589 A * | 10/1932 | Traut | ............. | 160/271 |
| 1,943,371 A * | 1/1934 | Cross | ............. | 160/133 |
| 2,407,784 A * | 9/1946 | Hoffstad | ............. | 160/273.1 |
| 2,846,254 A * | 8/1958 | Forest | ............. | 160/201 |
| 3,911,992 A * | 10/1975 | Webb | ............. | 160/290.1 |
| 4,800,946 A * | 1/1989 | Rosenoy | ............. | 160/264 |
| 5,893,603 A | 4/1999 | Viertel et al. | | |
| 2004/0068839 A1* | 4/2004 | Hock et al. | ............. | 16/215 |
| 2004/0104000 A1* | 6/2004 | Messerschmidt et al. | ............. | 160/370.22 |
| 2005/0205220 A1* | 9/2005 | Johnston et al. | ............. | 160/201 |

FOREIGN PATENT DOCUMENTS

| CN | 2191918 Y | 3/1995 |
|---|---|---|
| GB | 2 058 894 A | 4/1981 |

* cited by examiner

*Primary Examiner*—David Purol
(74) *Attorney, Agent, or Firm*—David S. Safran; Roberts Mlotkowski Safran & Cole, P.C.

(57) ABSTRACT

A darkening device (1) which has a shade fabric (10) which is mounted to be able to move for displacement between a receiving position in which it is taken up spaced apart from the region to be darkened, and a drawn position in which it extends underneath the region to be darkened, and supporting arrangement (30) which are able to support the shade fabric (10) in the transverse direction in the region to be darkened. The supporting arrangement (30) holds the side edges (11, 12) of the shade fabric (10), on the one hand, and on the other, tension the shade fabric (10) between the side edges (11, 12) in the transverse direction.

15 Claims, 3 Drawing Sheets

SHADING DEVICE FOR MOTOR VEHICLES

BACKGROUND OF THE INVENTION

1. Field of the Invention

This invention relates to a device for at least partial covering of one or more transparent panes by means of a material which can be rolled up, especially advantageously, but not exclusively, in the field of motor vehicles.

2. Description of Related Art

Currently, roofs of motor vehicles are being increasingly equipped with transparent or translucent panes. Generally, either a sliding roof system with a movable pane made of glass, or a fixed pane which directly forms a more or less large part of the head liner is provided.

Regardless of the respective embodiment, in practice, this type of more or less transparent pane is systematically used in combination with a darkening device which is suited to being extended parallel to the inside surface of the glass pane. Such a device is designed to prevent light rays which are penetrating through the glass pane from propagating in the interior of the vehicle. The goal is, of course, to limit the greenhouse effect within the motor vehicle on days with strong incident solar radiation.

Darkening devices known from the prior art include devices whose operation requires use of a fabric which can be rolled up. Expressed schematically, a more or less transparent shade fabric for displacement relative to a region to be darkened is mounted to be able to move between a holding position and an extended position. The whole is made such that the shade fabric, in the receiving position, is rolled onto a take-up tube which is attached at a distance from the region to be darkened and the shade fabric extends in the drawn position underneath the region to be darkened.

It can sometimes be advantageous for the shade fabric to be supported in the lengthwise direction and/or in the transverse direction in the region to be darkened. This applies especially when the pane has large dimensions in order to avoid any "hammock" phenomenon under the action of the inherent weight of the shade fabric, and in this way, to ensure the efficiency and the purely aesthetic appearance of the darkening device. However, this is also the case when the pane to be darkened has a significant curvature in order to follow the inside of the indicated pane in the best possible manner, and thus, to optimize the use of space within the vehicle.

Regardless of this, for execution of such lengthwise and/or transverse support, connecting to the shade fabric one or more relatively stiff transverse reinforcements which are able to slide between two guide rails which each are located on either side of the region to be darkened is known. The simple presence of the transverse reinforcements which are permanently joined to the shade fabric is sufficient to obtain the desired support in the transverse direction. And if this is combined with the use of guide rails which are shaped essentially parallel to the curvature of the pane to be darkened, this advantageously allows the desired support in the lengthwise direction to be obtained. It should be noted that due to the fact that the transverse reinforcements are permanently joined to the shade fabric, especially by means of coatings, they are able to slide together with it, on the one hand, in the region to be darkened, and on the other hand, to be taken up together with it around the take-up tube.

However, this type of darkening device has the disadvantage of being especially bulky in the receiving area of the shade fabric. The fact that the height of each of the transverse reinforcements is added to that of the shade fabric at the instant of take-up significantly increases the diameter of the whole in the receiving position. Ultimately, this is especially harmful for utilization of space in the motor vehicle, especially with reference to head room.

SUMMARY OF THE INVENTION

Accordingly, a primary object of this invention is to provide a darkening device which has a shade fabric which is mounted to be able to move for displacement between a receiving position in which it is taken up spaced apart from the region to be darkened, and a drawn position in which it extends underneath the region to be darkened, and supporting means which are able to support the shade fabric in the transverse direction in the region to be darkened, for which this darkening device would make it possible to avoid the problems in the prior art, especially by a considerably reduced space requirement being needed, and at the same time, optimum support of the shade fabric in the region to be darkened being guaranteed.

This object is achieved in accordance with the invention by the supporting means being suited to holding the side edges of the shade fabric, on the one hand, and on the other hand, to tensioning the shade fabric between the side edges.

The invention defined in this way offers the advantage that the presence of any transverse reinforcing elements for supporting the shade fabric and especially the numerous bulky, stiff reinforcements as in the prior art can be eliminated. This enables, specifically, minimizing the radial space requirement of the shade fabric when it is taken up into the receiving position, with which correspondingly optimum compactness of the darkening device is achieved.

This invention also relates to features which will become apparent from the following description and which must be considered individually in all possible technical combinations.

The description of a specific example with reference to the accompanying drawings is not intend to be limiting and is merely used for illustrating the concept of the invention and how it can be implemented.

DETAILED DESCRIPTION OF THE INVENTION

For reasons of clarity, the respectively identical components are labeled with identical reference numbers. Furthermore, only the components which are essential to the understanding of the invention are shown, this having been done not to scale and only in schematic form.

Figure 1:
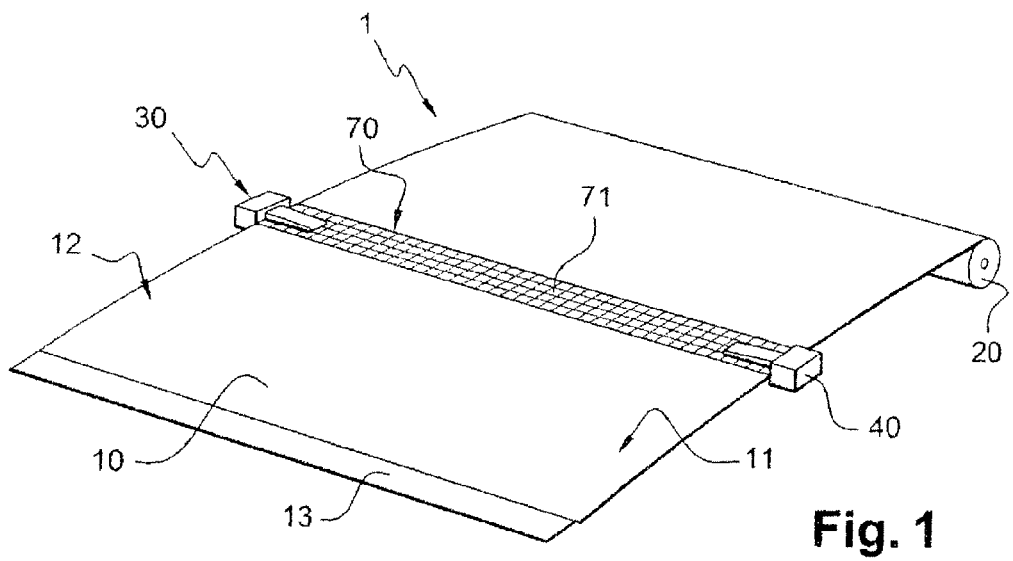
FIG. 1 shows a perspective view of a darkening device in accordance with the invention from the top, the shade fabric being located in the drawn position.

FIG. 1 shows a darkening device 1 of a motor vehicle which is designed to be permanently connected within the passenger compartment in order to limit the amount of light which penetrates through a fixed glass pane which forms the roof skin.

The darkening device 1 is, first of all, provided with an opaque shade fabric 10 which is suited to being drawn parallel to the inside surface of the glass pane. For this purpose, the shade fabric 10 is mounted to be able to move for displacement between a receiving position in which it is taken up on a take-up tube 20 which is attached spaced apart from the region to be darkened (FIG. 3), and a drawn position in which it extends underneath the indicated region to be darkened (FIG. 1). The darkening device 1 is also provided with supporting means 30 which can support the shade fabric 10 in the transverse direction within the region to be darkened.

It is noted that the region to be darkened under discussion is formed here by the actually transparent part of the glass pane, therefore, that part which in fact allows light rays to enter the interior of the passenger compartment and which, accordingly, is not located opposite any part of the vehicle body or any component of the interior equipment.

According to the subject matter of this invention, the supporting means 30 are suited, on the one hand, to holding the side edges 11, 12 of the shade fabric, and on the other, to tensioning the shade fabric 10 in the transverse direction between the side edges 11, 12 thereof.

According to a feature of the invention, the supporting means 30 are provided with at least one pair of sliding blocks 40 which are permanently connected essentially opposite each side edge 11, 12 of the shade fabric 10. The supporting means 30 are also provided with two guide rails 50 which are located on either side of the region to be darkened. The whole is made such that the sliding blocks 40 can interact with each guide rail 50 by sliding in the lengthwise direction and sliding in the transverse direction. According to this first feature of the invention, the supporting means 30 have elastic return means 60 which can entrain each sliding block 40 in a sliding motion in the transverse direction to the outside.

It is very important to note that, in this entire text, the concept of displacement to the outside means moving away relative to the edge 11, 12 of the shade fabric 10, i.e., when a sliding block 40 is examined, motion in the direction opposite to the sliding block 40 which is connected directly to it at the time within the framework of the same pair. Analogously, displacement to the outside means any approach motion relative to an edge 11, 12 of the shade fabric 10, i.e., when a sliding block 40 is examined, motion in essentially the direction relative to the other directly connected sliding block 40.

Figure 2:
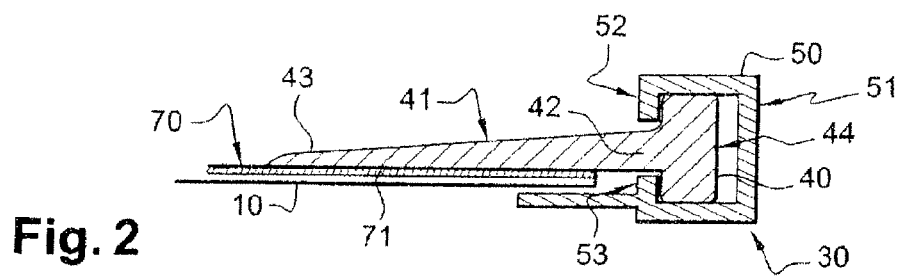
FIG. 2 is a cross-sectional view of an edge portion the darkening device of FIG. 1, the shade fabric being located in the drawn position.

According to another inventive feature which is especially apparent from FIGS. 1 & 2, for each pair of sliding blocks 40, the supporting means 30 has a transverse reinforcing element 70 which is permanently connected to the shade fabric 10 and extends in the transverse direction between the sliding blocks 40. This feature enables improvement of the stretching strength of the shade fabric 10 in the transverse direction at any location at which the shade fabric 10 is to be tensioned, i.e., between each sliding block of the same pair.

In an especially advantageous manner, here, each transverse reinforcing element 70 is formed by a strip 71 of shade fabric which is connected directly to the shade fabric 10. In this special embodiment of the invention which is given solely as an example, the strip 71 of shade fabric is sewn onto the top of the shade fabric 10. Of course any known fastening technique could be used alternatively or additionally, such as, for example, cementing, bonding, etc.

Figure 3:
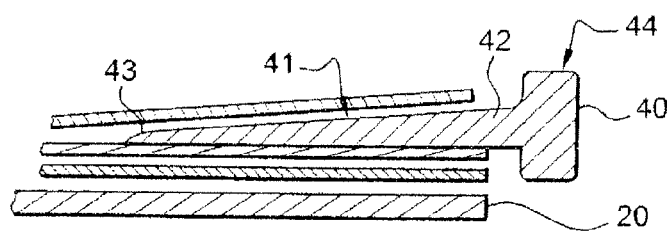
FIG. 3 is a view corresponding to that of FIG. 2 but showing the shade fabric in the receiving position.

As is especially apparent from FIGS. 2 & 3, the part which is labeled as the support 41 of each sliding block 40 and which is permanently connected to the shade fabric 10, has an essentially flat and thin form which extends in the transverse direction to the respective sliding block 40. This feature makes it possible to minimize the radial amount of space required by the shade fabric 10 in the region of the side edges 11, 12 in the receiving position.

In this embodiment, the supporting part 41 of each sliding block 40 has a beveled profile with a tip aligned in the direction to the pertinent sliding block 40. The fact that the thickness of the supporting part 41 decreases from its base 42 to its free end 43 contributes to compactness of the shade fabric 10 in the receiving position and at the same time offers sufficient stiffness to ensure the proper support of the corresponding side edge 11, 12.

As shown in FIG. 2, the part which is designated the sliding part 44 of each sliding block 40 and which is designed to interact with one of the guide rails 50 by sliding has a cross section with a width which is much less than the inside cross section of the inner guide rail 50. This feature is essential to ensure the mobility of each sliding shoe 40 in the transverse direction, when, as is the case here, the corresponding guide rail 50 has a U-shaped cross section with lengthwise edges which are dramatically bent down toward one another.

In an especially advantageous manner, each guide rail 50 has at least one external lengthwise part 51 which is suited to block sliding in the transverse direction to the outside of each sliding block 40 with which the indicated guide rail 50 is intended to interact by sliding. As mentioned, the sliding in the transverse direction to the outside means any displacement of the sliding block 40 away from the corresponding edge 11, 12 of the shade fabric 10, i.e., therefore, in the direction opposite the sliding block 40 which is directly connected to it.

According to another advantageous feature of the invention, each guide rail 50 has at least one inner lengthwise part 52, 53 which blocks sliding in the transverse direction to the inside of each sliding block 40 with which the indicated guide rail 50 is designed to interact by sliding. Analogously, as stated above, sliding in the transverse direction to the inside is defined as any displacement of the sliding block 40 in the form of approaching the corresponding edge 11, 12 of the shade fabric 10, i.e., the direction toward the directly connected sliding block 40.

Figure 4:
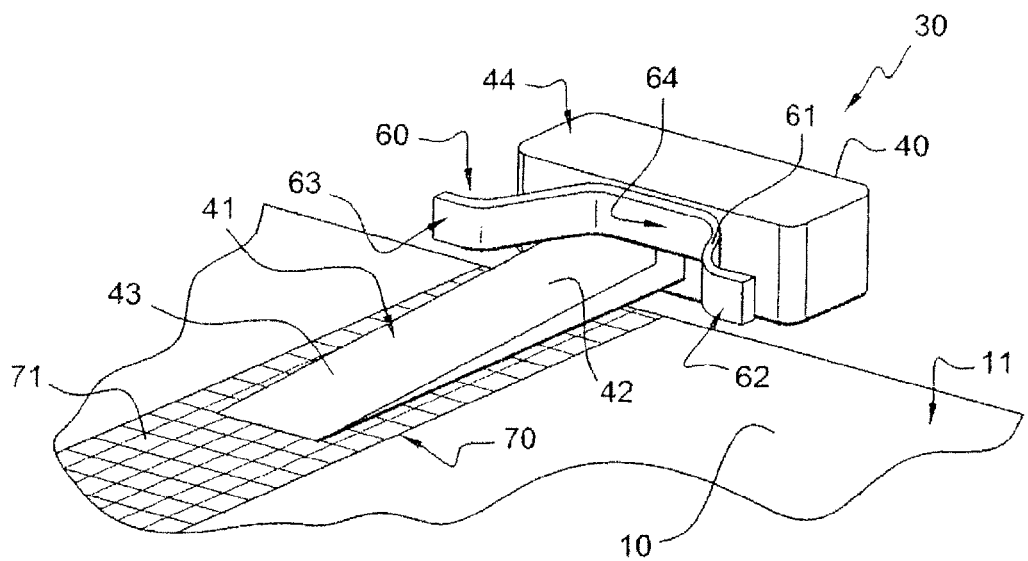
FIG. 4 is a perspective of a supporting means according to a first embodiment of the invention.
Figure 5:
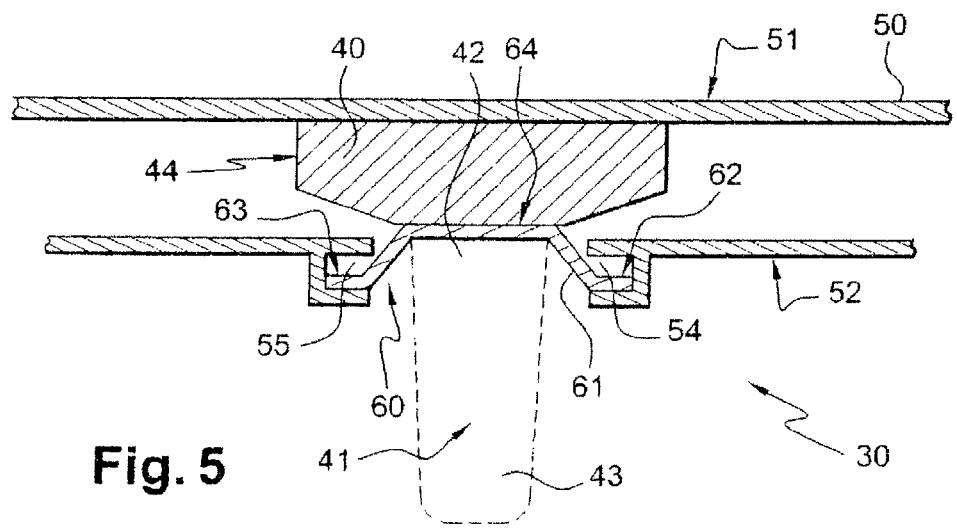
FIG. 5 is a lengthwise sectional view of the supporting means as shown in FIG. 4, a top view the supporting part being represented by broken lines.

FIGS. 4 & 5 more accurately show the supporting means 30 which are used in the darkening device 1.

According to a first embodiment of the invention, each guide rail 50 for each sliding block 40 has at least one elastic return means 60 which can apply a pushing force on the indicated sliding block 40 when the shade fabric 10 is in the drawn position. Otherwise, the whole is made such that the pushing force, on the one hand, is directed in a form perpendicular essentially to the guide rail 50 and, on the other hand, to the outside. This means, in other words, that each sliding block 40 is connected to at least one elastic return means 60 which is inserted into it along the guide rail 50, more exactly at the location at which the indicated sliding block 40 is to come to rest when the shade fabric 10 is in the drawn position.

In an especially advantageous manner, here, each elastic return means 60 is formed by an elastically deformable skid 61, of which at least one part which is designated the connecting part 62, 63 is connected to an inner lengthwise part 52, 53 of the corresponding guide rail 50, and of which at least one other part which is designated as a support part 64 and which projects relative to the indicated inner lengthwise part 52, 53 and can be elastically deformed in the direction essentially perpendicular to the guide rail 50 upon contact with a sliding block 40.

In this embodiment, the elastically deformable skid 61 is permanently connected to the guide rail 50 via its two ends which form the connecting parts 62, 63 and which engage two receivers 54, 55 which are suitable arranged along the inner lengthwise part 52. The elastically deformable skid 61 is, moreover, able to interact by sliding contact with any approaching sliding block 40 via its middle part which forms a support part 64 and which extends within the indicated guide rail 50 projecting relative to the internal lengthwise part 52.

Figure 6:
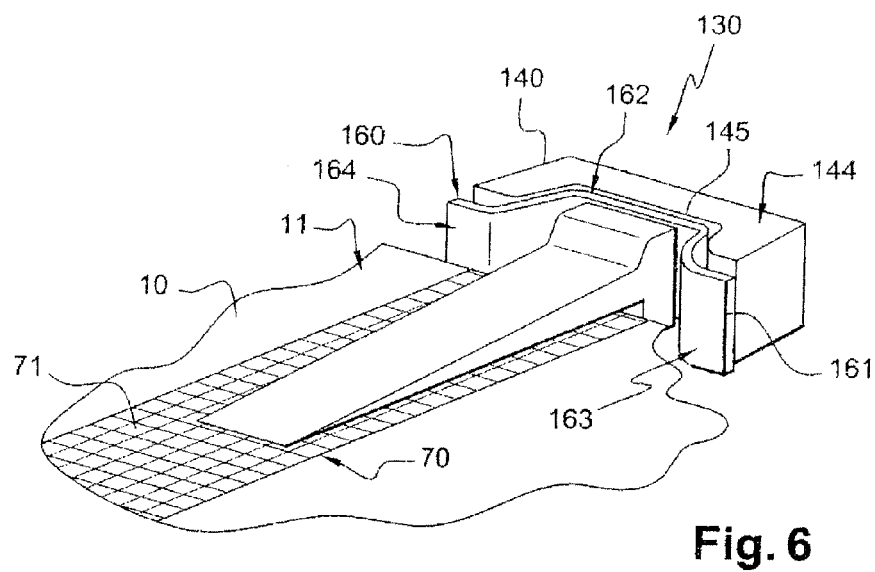
FIG. 6 is a perspective of the supporting means according to a second embodiment of the invention.
Figure 7:
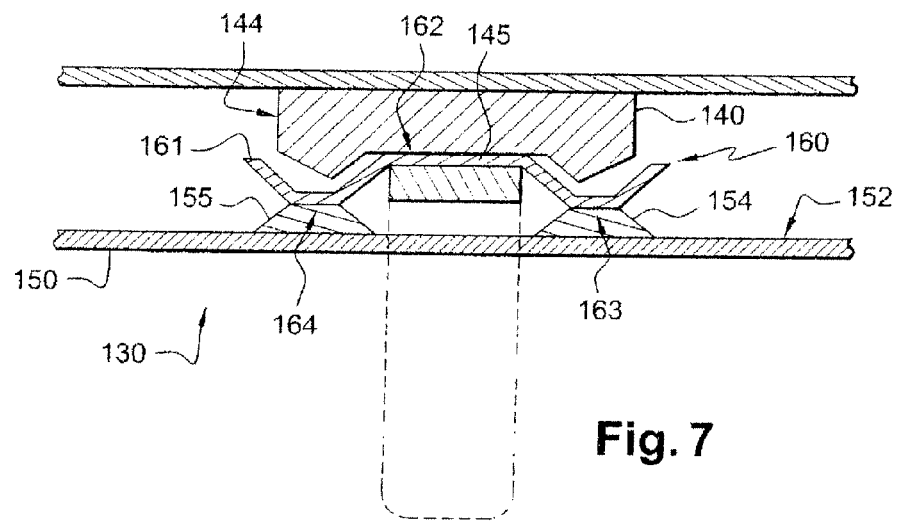
FIG. 7 is a lengthwise sectional view of the supporting means as shown in FIG. 6, a top view the supporting part being represented by broken lines.

FIGS. 6 & 7 relate to supporting means 130 according to a second embodiment of the invention.

The second embodiment is characterized in that each sliding block 140, here, has at least one elastic return means 160 which can apply a pushing force against an inner lengthwise part 152 of the corresponding guide rail 150; this force is aligned in the essentially perpendicular direction to the guide rail 150 and is pointed to the inside.

It is noted that, in this special embodiment, each sliding block 140 is continually exposed to the action of an elastic return means 160 when it is inserted into its guide rail 150, i.e., regardless of the position of the indicated sliding block 140 along the respective guide rail 150.

In an especially advantageous manner, the inner lengthwise part 152 of each guide rail 150, for each sliding block 140, has at least one projecting part 154, 155 which is able to serve as a support surface for at least one elastic return means 160 of the indicated sliding block 140 when the shade fabric 10 is in the drawn position.

This means that the different projecting parts 154, 155 are attached at the locations of the guide rail 150 at which the different sliding blocks 140 of the darkening device 1 are to come to rest, when the shade fabric 10 moves into the drawn position. This feature, in any case, makes it possible to increase the strength of the pushing forces which are produced by the different elastic return means 160, and accordingly, to greatly improve the efficiency of the supporting means 130.

According to another advantageous feature, each elastic return means 160 is formed by an elastically deformable skid 161, of which at least one part, which is designated the connecting part 62, 63, is permanently connected to the corresponding sliding block 140 and of which at least one other part, which is designated the supporting part 163, 164, is suited to interacting, on the one hand, by sliding with the inner lengthwise part 152 of the corresponding guide rail 150, and on the other hand, to being elastically deformed against the inner lengthwise part 152 in the direction which is essentially at a right angle to the guide rail 150.

In this embodiment, the elastically deformable skid 161 is permanently connected to the sliding block 140 via its central section which forms the connecting part 162 which, under the action of a force, is inserted into a gap 145 which is formed accordingly in the sliding part 144 of the sliding block 140. The elastically deformable skid 161 is also suited to interacting by sliding contact with the inner lengthwise part 152 of the corresponding guide rail 150, and optionally, by means of its ends which form two supporting parts 163, 164, with any projecting part 154, 155. The whole is otherwise made such that each support part 163, 164 can elastically deform against the corresponding inner lengthwise part 152, and optionally, in the direction essentially perpendicular to the guide rail 150 against any projecting part 154, 155.

According to another feature of the invention, the darkening device 1 is provided with a take-up tube 20 which can take up the shade fabric 10 in the receiving position and is entrained in axial rotation into a take-up motion via an elastic return means (not shown). According to the same feature, the darkening device 1 otherwise has means of locking of the shade fabric 10 in the drawn position. This feature advantageously makes it possible to tension the shade fabric 10 in the lengthwise direction.

The locking means which are likewise not shown for the sake of clarity can be of any known type and can assume, for example, the form of a rocker hook which interacts with the anchoring opening. In practice, the hook is preferably coupled to the draw bar 13 of the shade fabric 10. Under this assumption, the shade fabric 10 is advantageously tensioned between the take-up tube 20 and the draw bar 13 in the lengthwise direction.

According to another feature of the invention, the device has a motor drive which is suited to entraining the shade fabric 10 from the (taken-up) receiving position to the drawn position and vice versa, the indicated motor drive making it possible to stop the system in all intermediate positions.

Of course, the invention relates quite generally to a motor vehicle which is equipped with at least one darkening device 1 as described above.

What is claimed is:

1. Darkening device, comprising:
   a shade made of a length of fabric material which is mounted to be movable between a receiving position in which it is taken up spaced apart from a region to be darkened, and a drawn position in which it extends underneath the region to be darkened, and
   supporting means for supporting the shade in a transverse direction in the region to be darkened,
   wherein the supporting means holds only areas near side edges of the shade fabric material at a portion of the shade fabric material that is longitudinally intermediate ends thereof and wherein the supporting means tensions the shade between the side edges by applying a stretching the force to the shade fabric material in said transverse direction, and
   wherein the supporting means comprises at least a pair of sliding blocks permanently connected essentially opposite each other on the side edges of the shade, a guide rail located on each side of the region to be darkened, wherein each of the sliding blocks slidably interacts with a respective guide rail in a lengthwise direction of the guide rails and in a transverse direction of the guide rails, and wherein the supporting means have elastic return means which entrain each sliding block in a sliding motion in the transverse direction to the outside.

2. Darkening device as claimed in claim 1, wherein the supporting means have a transverse reinforcing element for each sliding block which is permanently connected to the shade and extends in the transverse direction between the sliding blocks connected opposite each other.

3. Darkening device as claimed in claim 2, wherein each transverse reinforcing element comprises a strip of the shade fabric material which is connected directly to the shade.

4. Darkening device as claimed in claim 1, wherein a supporting part of each sliding block which is permanently connected to the shade has an essentially flat and thin form which extends in the transverse direction relative to the respective sliding block and inward from a respective side edge of the fabric material .

5. Darkening device as claimed in claim 4, wherein the supporting part of each sliding block has a beveled profile which tapers in a direction away from the respective sliding block.

6. Darkening device as claimed in claim 1, wherein a sliding part of each sliding block slidingly interacts with a respective guide rail and has a cross section with a width which is much less than an inside cross section of the guide rail.

7. Darkening device as claimed in claim 1, wherein each guide rail has at least one external lengthwise part which blocks sliding in the transverse direction to the outside of each sliding block with which the guide rail interacts.

8. Darkening device as claimed in claim 1, wherein each guide rail has at least one internal lengthwise part which blocks sliding of the sliding blocks with which the guide rail interacts in the transverse direction to the outside.

9. Darkening device as claimed in claim 1, wherein each guide rail has at least one elastic return means which applies a pushing force to the respective sliding block when the shade fabric is in the drawn position, the pushing force being directed essentially perpendicular to the guide rail and relative to the outside.

10. Darkening device as claimed in claim 9, wherein each elastic return means comprises an elastically deformable skid that has at least one connecting part which is connected to an inner lengthwise part of the corresponding guide rail, and at least one supporting part which projects relative to an inner lengthwise part and which elastically deforms in the direction essentially perpendicular to the guide rail upon contact with a sliding block.

11. Darkening device as claimed in claim 1, wherein each sliding block has at least one elastic return means which applies a pushing force against an inner lengthwise part of the corresponding guide rail, which force is directed essentially perpendicular to the guide rail and to the inside.

12. Darkening device as claimed in claim 1, wherein an inner lengthwise part of each guide rail has at least one projecting part for each sliding block which forms a support surface for at least one elastic return means of the respective sliding block when the shade is in the drawn position.

13. Darkening device as claimed in claim 1, wherein each elastic return means comprises an elastically deformable skid which has at least one connecting part that is permanently connected to a sliding block and at least one supporting part which slidingly interacts with an inner lengthwise part of the corresponding guide rail and deforms against the inner lengthwise part in a direction essentially perpendicular to the guide rail.

14. Darkening device as claimed in claim 3, wherein a take-up tube takes up the shade in the receiving position and which is rotatably driven by an elastic return means and has a locking means for holding the shade in the drawn position.

15. Darkening device as claimed in claim 1, wherein a motor drive moves the shade between the taken-up receiving position and the drawn position, the motor drive being stoppable in all intermediate positions between the taken-up receiving position and the drawn position.

* * * * *